United States Patent
Flach

(10) Patent No.: US 8,579,652 B2
(45) Date of Patent: Nov. 12, 2013

(54) FASTENING DEVICE FOR AN ELECTRIC CABLE

(75) Inventor: Rosmarie Flach, Seuzach (CH)

(73) Assignee: Leoni Studer AG, Daniken SO (CH)

( * ) Notice: Subject to any disclaimer, the term of this patent is extended or adjusted under 35 U.S.C. 154(b) by 90 days.

(21) Appl. No.: 13/182,527

(22) Filed: Jul. 14, 2011

(65) Prior Publication Data
US 2012/0322295 A1 Dec. 20, 2012

(30) Foreign Application Priority Data
Jun. 16, 2011 (CH) .................................... 1022/11

(51) Int. Cl.
*H01R 13/68* (2011.01)
(52) U.S. Cl.
USPC ........................................................ 439/462
(58) Field of Classification Search
USPC .................................. 439/460–462
See application file for complete search history.

(56) References Cited

U.S. PATENT DOCUMENTS

| | | | | | |
|---|---|---|---|---|---|
| 3,989,340 | A | * | 11/1976 | Sheldon et al. | 439/462 |
| 5,137,470 | A | * | 8/1992 | Doles | 439/578 |
| 5,989,056 | A | * | 11/1999 | Lange et al. | 439/412 |
| 6,149,455 | A | * | 11/2000 | Levi | 439/462 |
| 7,587,244 | B2 | * | 9/2009 | Olbertz | 607/37 |
| 7,938,674 | B2 | * | 5/2011 | Lindkamp et al. | 439/462 |
| 2005/0208827 | A1 | * | 9/2005 | Burris et al. | 439/578 |

* cited by examiner

*Primary Examiner* — Briggitte R Hammond
(74) *Attorney, Agent, or Firm* — Brian Roffe

(57) ABSTRACT

A fastening device for an electric cable is provided with an outer casing (15) in which on one side a nut (12) can be screwed, by means of which at least one clamping ring (20) pressing against the outer insulation of the cable (11) can be arranged adjustably. The clamping ring (20) is provided with a number of segments (22) connected to one another and respectively moveable approximately radially, which each have on their inner surface at least one projection (24). The respective projection (24) is formed such that the latter is pressed in when the nut (12) is screwed into the outer insulation of the cable (11). A consistently long service life and also inexpensive production of this type of fastening device is thus made possible.

20 Claims, 1 Drawing Sheet

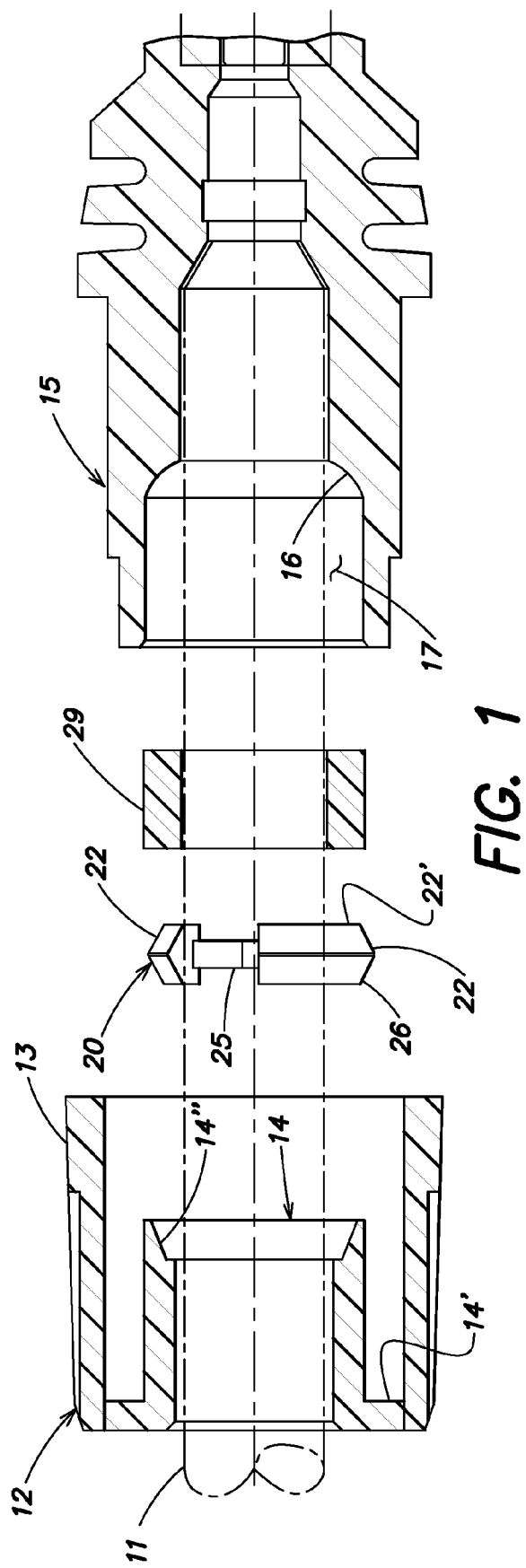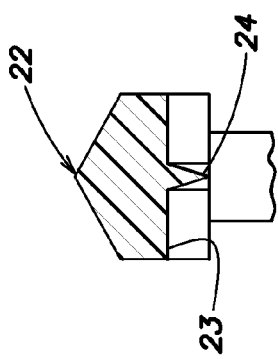

FASTENING DEVICE FOR AN ELECTRIC CABLE

FIELD OF THE INVENTION

The present invention relates to a fastening device for an electric cable comprising an outer casing in which on one side a nut can be screwed, by means of which at least one clamping ring pressing against the outer insulation of the cable can be arranged adjustably.

BACKGROUND OF THE INVENTION

These fastening devices are used, for example, with electrical connections of cables for solar cells. The plug connectors required to connect the solar cell modules are subjected over a long period of time to atmospheric conditions, and so both to large temperature changes and to humidity. Nevertheless, they must constantly convey the electric currents largely without loss.

With a known device for photovoltaic installations a sealing and clamping means is formed which has a hard ring pressing against a cable insulation in order to relieve stress, onto which a more elastic sealing element is moulded.

From DE-OS 21 33 814 a liquid-tight, tension-free connector is known with which a conductor clamping device has segments which are connected to one another by undulating bars so as to enable the segments to tighten around the conductor while the connector is assembled, and to move away from the conductor when the connector is taken apart.

Not only is it expensive to produce these clamping devices, but it is also necessary to adapt the stress relief and sealing means separately to every cable diameter. This additionally increases production costs due to the necessity for a more complex supply inventory.

OBJECTS AND SUMMARY OF THE INVENTION

The object underlying the invention is to improve a fastening device for an electric cable such that it enables both a consistently long service life and inexpensive fastening.

According to the invention the object is achieved in that the clamping ring is provided with a number of segments connected to one another and respectively moveable approximately radially, which each have on their inner surface at least one projection which is formed such that the latter is pressed in when the nut is screwed into the outer insulation of the cable.

In one advantageous embodiment the clamping ring and a sealing means are produced as separate components, and when the fastening device is fitted, the sealing means is pushed by the stress relief means into the sealing position.

According to the invention the clamping ring has a plurality of segments connected to one another which can move towards one another in order to actuate the clamp, and can be moved approximately radially inwards towards one another. For this purpose it is particularly preferred if the segments of the clamping ring are connected to one another by flexible connection strips.

BRIEF DESCRIPTION OF THE DRAWINGS

An exemplary embodiment of the invention and further advantages of the latter are described in more detail by means of the drawings. These show as follows:

FIG. 1 is an exploded illustration of a fastening device according to the invention for an electric cable, and FIG. 2 is an enlarged partial section of a clamping ring of the part according to FIG. 1.

DETAILED DESCRIPTION OF THE INVENTION

FIG. 1 shows a fastening or fixing device 10 of a cable 11, indicated by a dashed and dotted line, with a partially illustrated outer casing 15 which in the part not detailed can have a spur by means of which an electrical connection is produced in a conventional manner. These fastening devices are used in particular for photovoltaic installations with which solar cell modules are coupled to one another or for connection to a station. For this purpose this outer casing 15 is formed from a sufficiently weather-proof and so non-brittle plastic material, for example from fibre-reinforced plastic.

A nut 12 on the outer casting 15 can be screwed onto the side facing away from the connection piece (not detailed) by means of which at least one clamping ring 20 pressing against the outer insulation of the cable 11 can be adjusted.

According to the invention the clamping ring 20 is provided with a number of segments 22 connected to one another, which can respectively move approximately radially, and which each have on their inner surface 23 at least one projection 24 which is formed such that the latter presses into the outer insulation of the cable 11 when the nut 12 is screwed in.

According to FIG. 2 these projections 24 are respectively formed as ribs with a V-shaped cross-section extending laterally to the longitudinal axis of the outer casing which can be pressed by their tips into the outer insulation of the cable. For this purpose this clamping ring 20 is produced from a harder plastic than with the plastics used for insulating the cables or from a rust-proof metal.

The clamping ring 20 comprises three segments 22 and intermediate pieces 25 connecting the latter, which are formed in a strip and with a thinner cross-section than the segments 22 so that radial adjustment of these segments is made possible. These segments 22 are advantageously provided at a certain angle and spaced evenly apart from one another.

The nut 12 consists of an outer casing 13, a connection bar 14' and a shorter inner casing 14. This outer casing 13 can be screwed on by means of an internal thread (not detailed) onto the outer casing 15, the inner casing 14, however, being provided with an internal diameter of approximately the same size as the cable 11 to be secured, and with a conical bevel 14". This bevel 14" has dimensions such that it co-operates with a cone-shaped slant 26 on the outside of the clamping ring 20 and lies flat against the latter.

Furthermore, a sealing ring 29 produced from an elastic material is provided which, in the fitted state of the fastening device 10, abuts with one face side against an inner surface 16 with a rounded cross-section of the outer casing 15, and with the other face side against the clamping ring 20. This sealing ring 29 is also provided with an internal diameter approximately equal to that of the cable 11.

When fastening the cable 11 in the part, the cable is pushed with the connection piece pre-fitted to the latter on the end through the nut 12, the clamping ring 20 and the sealing ring 29, and into the outer casing 15. The nut 12 can now be screwed onto the outer casing 15, and the clamping ring 20 and the sealing ring 29 can be pushed here into a corresponding opening 17 in the outer casing 15. The bevel 14" on the inner casing 14 of the nut 12 presses against the cone-shaped slant 26 on the outside of the clamping ring 20, and the latter on its part presses on the face side against the sealing ring 29 which abuts against the inner surface 16. When tightened the segments 22 of the clamping ring on the one hand and this elastic sealing ring 29 are pressed approximately radially inwards against the outer insulation of the cable 11.

By pressing in these ribs 24 of the segments 22 with a V-shaped cross-section, it is initially achieved that the cable 11 can not be pulled out with tensile stress, whereas with the elastic sealing ring 29 moisture is prevented from passing into the inside of the fastening device, by means of which a service life of the latter over decades is guaranteed.

The invention is sufficiently well displayed with the exemplary embodiment described. However, it could also be illustrated using different variants. For example, the ribs can be formed differently on the inner surface 23 of the clamping ring 20, or a number of ribs for each segment could be formed next to one another or in the form of a thread. The number of segments and the shape of the intermediate pieces 25 could also be different.

The invention claimed is:

1. A fastening device for an electric cable, comprising:
   an outer casing;
   a nut configured to be screwed onto one side of the outer casing; and
   a clamping ring adapted to press against the cable when the cable is engaged with the outer casing and the nut is screwed onto the outer casing, the clamping ring including a slant on an outer surface and being adjusted by the nut;
   the clamping ring including a number of segments connected to one another and that are movable approximately radially, each of the segments having at least one projection on an inner surface such that the at least one projection is pressed in when the nut is screwed onto the outer casing,
   the nut comprising an outer casing and an inner casing, the inner casing being provided with a conical bevel and having dimensions such that the conical bevel cooperates with the slant on the outer surface of the clamping ring.

2. The fastening device according to claim 1, wherein the at least one projection on the inner surface of each of the segments is formed as a rib extending laterally to a longitudinal axis of the outer casing.

3. The fastening device according to claim 2, wherein each rib is formed with a V-shaped cross-section and is configured to be pressed by its tip into the cable when the cable is engaged with the outer casing.

4. The fastening device according to claim 1, wherein the clamping ring comprises three segments and intermediate pieces connecting the three segments, the intermediate pieces being formed in a strip and having a thinner cross-section than a cross-section of the segments.

5. The fastening device according to claim 1, wherein the outer casing includes an inner surface having a rounded cross-section, further comprising a sealing ring having a fitted state in which the sealing ring has one side face abutting against the inner surface with the rounded cross-section of the outer casing and has an opposite side face abutting against the clamping ring.

6. The fastening device according to claim 5, wherein the sealing ring is made from elastic material.

7. The fastening device according to claim 5, wherein internal diameters of the inner casing of the nut, the clamping ring and the sealing ring correspond approximately to a diameter of the cable being fastened by the fastening device.

8. The fastening device according to claim 1, wherein internal diameters of the inner casing of the nut, and the clamping ring correspond approximately to a diameter of the cable being fastened by the fastening device.

9. A fastening device for an electric cable, comprising:
   an outer casing including an inner surface having a rounded cross-section;
   a clamping ring adapted to press against the cable when the cable is engaged with the outer casing;
   a nut configured to be screwed onto one side of the outer casing and to adjust the clamping ring; and
   a sealing ring having a fitted state in which the sealing ring has one side face abutting against the inner surface with the rounded cross-section of the outer casing and has an opposite side face abutting against the clamping ring,
   the clamping ring including a number of segments connected to one another and that are movable approximately radially, each of the segments having at least one projection on an inner surface such that the at least one projection is pressed in when the nut is screwed onto the outer casing.

10. The fastening device according to claim 9, wherein at least one projection on the inner surface of each of the segments is formed as a rib extending laterally to a longitudinal axis of the outer casing.

11. The fastening device according to claim 10, wherein each rib is formed with a V-shaped cross-section and is configured to be pressed by its tip into the cable when engaged with the outer casing.

12. The fastening device according to claim 9, wherein the clamping ring comprises three segments and intermediate pieces connecting the three segments, the intermediate pieces being formed in a strip and having a thinner cross-section than a cross-section of the segments.

13. The fastening device according to claim 9, wherein the sealing ring is made from elastic material.

14. The fastening device according to claim 9, wherein internal diameters of the inner casing of the nut, the clamping ring and the sealing ring correspond approximately to a diameter of the cable being fastened by the fastening device.

15. A fastening device for an electric cable, comprising:
   an outer casing;
   a clamping ring including a slant on an outer surface; and
   a nut for adjusting the clamping ring and that is adapted to be screwed onto the outer casing;
   the clamping ring including a plurality of segments connected to one another, each of the segments having at least one projection on an inner surface, the clamping ring being configured such that upon screwing of the nut onto the outer casing, the projections move radially inward to thereby fasten the cable when the cable is engaged with the outer casing,
   the nut comprising an outer casing and an inner casing, the inner casing being provided with a conical bevel and having dimensions such that the conical bevel cooperates with the slant on the outer surface of the clamping ring,
   at least one of the projections being formed as a rib extending laterally to a longitudinal axis of the outer casing.

16. The fastening device according to claim 15, wherein each rib is formed with a V-shaped cross-section and is configured to be pressed by its tip into the cable when the cable is engaged with the outer casing.

17. The fastening device according to claim 15, wherein the clamping ring comprises three segments and intermediate pieces connecting the three segments, the intermediate pieces being formed in a strip and having a thinner cross-section than a cross-section of the segments.

18. The fastening device according to claim 15, further comprising a sealing ring having a fitted state in which the sealing ring has one side face abutting against an inner surface of the outer casing and has an opposite side face abutting against the clamping ring.

19. A fastening device for an electric cable, comprising:
an outer casing;
a clamping ring including a slant on an outer surface;
a nut for adjusting the clamping ring and that is adapted to be screwed onto the outer casing; and
a sealing ring having a fitted state in which the sealing ring has one side face abutting against an inner surface of the outer casing and has an opposite side face abutting against the clamping ring,
the clamping ring including a plurality of segments connected to one another, each of the segments having at least one projection on an inner surface, the clamping ring being configured such that upon screwing of the nut onto the outer casing, the projections are moved radially inward to thereby fasten the cable when the cable is engaged with the outer casing,
at least one of the projections being formed as a rib extending laterally to a longitudinal axis of the outer casing.

20. The fastening device according to claim 19, wherein the sealing ring is made from elastic material.

\* \* \* \* \*